US 7,854,267 B2

(12) United States Patent
Smith et al.

(10) Patent No.: US 7,854,267 B2
(45) Date of Patent: Dec. 21, 2010

(54) METHODS AND SYSTEMS TO ACTIVATE DOWNHOLE TOOLS WITH LIGHT

(75) Inventors: David R. Smith, Kilgore, TX (US); Rogerio T. Ramos, Hampshire (GB); Arthur H. Hartog, Windchester (GB); Vladimir Vaynshteyn, Sugar Land, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 79 days.

(21) Appl. No.: 12/430,486

(22) Filed: Apr. 27, 2009
(Under 37 CFR 1.47)

(65) Prior Publication Data
US 2010/0025032 A1 Feb. 4, 2010

Related U.S. Application Data

(63) Continuation of application No. 10/525,910, filed as application No. PCT/GB03/03781 on Aug. 29, 2003, now abandoned.

(60) Provisional application No. 60/507,074, filed on Aug. 30, 2002.

(51) Int. Cl.
*E21B 41/00* (2006.01)
*E21B 47/01* (2006.01)
(52) U.S. Cl. .................. 166/381; 166/250.01; 166/63; 166/300

(58) Field of Classification Search .................. 166/63, 166/381, 300, 250.01
See application file for complete search history.

(56) References Cited

U.S. PATENT DOCUMENTS

| 4,870,902 | A | 10/1989 | Simon et al. |
| 5,211,714 | A | 5/1993 | Jordan et al. |
| 5,279,366 | A | 1/1994 | Scholes |
| 5,322,019 | A | 6/1994 | Hyland |
| 5,413,045 | A | 5/1995 | Miszewski |
| 5,730,940 | A | 3/1998 | Nakagawa |
| 6,394,184 | B2 | 5/2002 | Tolman et al. |
| 2002/0023759 | A1 | 2/2002 | Deaton |
| 2003/0197849 | A1 | 10/2003 | Ishikawa et al. |
| 2005/0263281 | A1* | 12/2005 | Lovell et al. ............. 166/255.1 |

FOREIGN PATENT DOCUMENTS

GB 2364380 A 1/2002

* cited by examiner

*Primary Examiner*—Jennifer H Gay
(74) *Attorney, Agent, or Firm*—Rodney V. Warfford; Kevin B. McGoff; Tim Curington

(57) ABSTRACT

The present invention comprises a system and methods to actuate downhole tools by transmitting an optical signal through an optical fiber to the downhole tool. The optical signal can comprise a specific optical signal frequency, signal, wavelength or intensity. The downhole tool can comprise packers, perforating guns, flow control valves, such as sleeve valves and ball valves, samplers, sensors, pumps, screens (such as to expand), chemical cutters, plugs, detonators, or nipples.

29 Claims, 8 Drawing Sheets

METHODS AND SYSTEMS TO ACTIVATE DOWNHOLE TOOLS WITH LIGHT

CROSS REFERENCE TO RELATED APPLICATION

This application is a continuation of U.S. application Ser. No. 10/525,910 filed May 18, 2006 which is a provisional of U.S. Application No. 60/507,074 filed Aug. 30, 2002.

BACKGROUND

The invention generally relates to the activation of downhole tools. More particularly, the invention relates to methods and systems used to activate downhole tools with light.

Downhole tools are typically activated by mechanical, electrical, or hydraulic means. Each of these types of actuation have potential problems. Mechanically actuated tools normally rely on translation or torsion of the tube or cable connecting the tool to the surface. However, movement on the surface does not always translate into movement down-hole at the location of the tool. Furthermore, the movement of the tool may remove it from the position where the actuation is required. Electrically actuated tools need cables in which electrical insulation is required. The insulation is often bulky and compromises the strength of the cable. Electrical actuation is also sensitive to spurious currents and interference that could result in undesirable actuation. Hydraulically actuated tools also suffer from the risk of undesirable actuation or actuation at the wrong depth. The local pressure at the tool is difficult to control in some circumstances. All the above require complex control mechanisms to prevent undesirable activation.

Moreover, reliability and safety are important when operating downhole tools, since a faulty tool can result in a substantial increase in costs and time for an operator and can also sometimes endanger the lives of workers. These issues are heightened when they relate to perforating guns, as these tools must have a very high level of reliability and safety.

Thus, there exists a continuing need for an arrangement and/or technique that addresses one or more of the problems that are stated above.

SUMMARY

The present invention comprises a system and methods to actuate downhole tools by transmitting an optical signal through an optical fiber to the downhole tool. The optical signal can comprise a specific optical signal frequency, signal, wavelength or intensity. The downhole tool can comprise packers, perforating guns, flow control valves, such as sleeve valves and ball valves, samplers, sensors, pumps, screens (such as to expand), chemical cutters, plugs, detonators, or nipples.

Advantages and other features of the invention will become apparent from the following description, drawing and claims.

DETAILED DESCRIPTION

Figure 1:
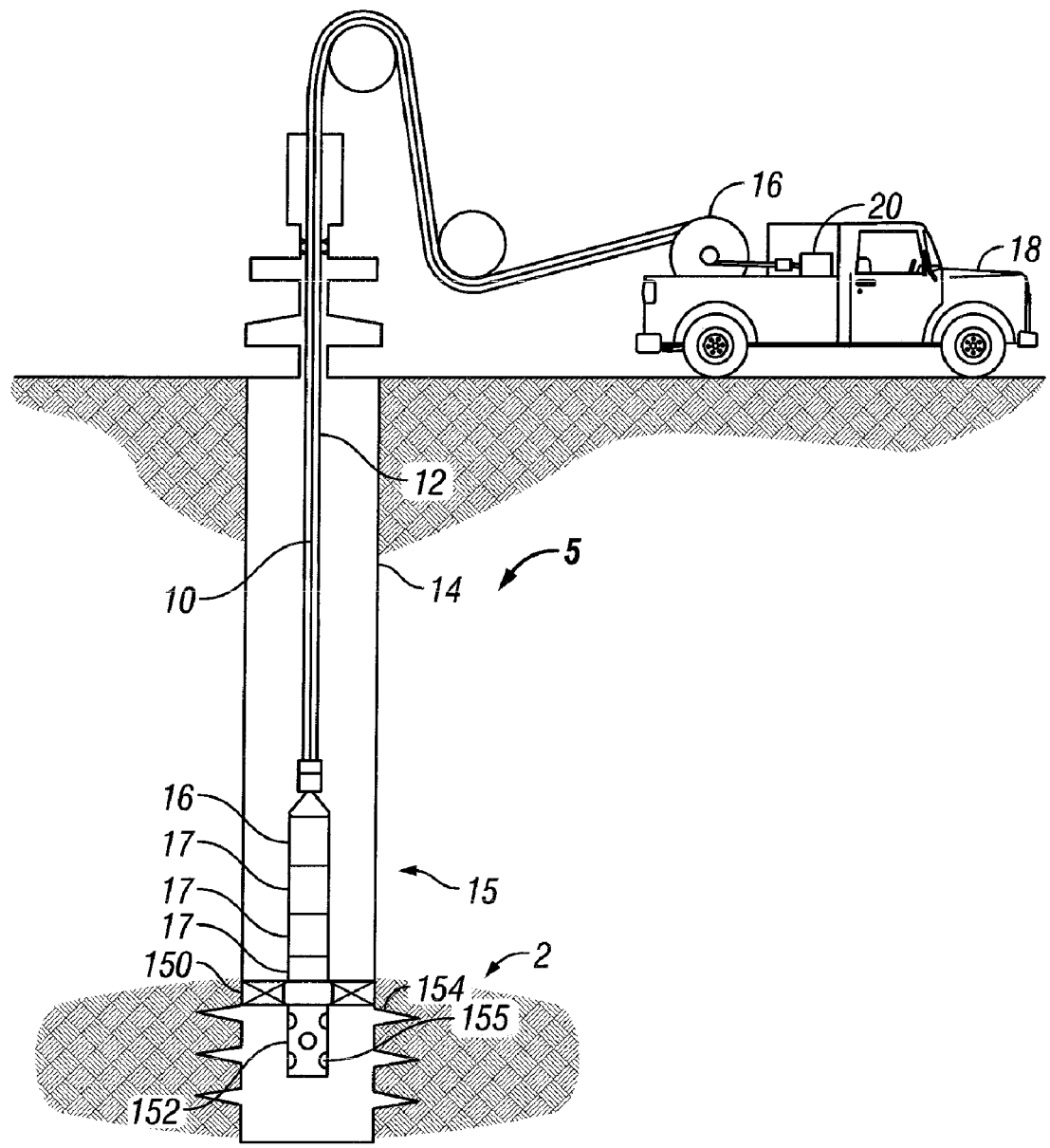
FIG. 1 shows one embodiment of the activation system and methods.

FIG. 1 shows one embodiment of this invention in which light is transmitted through an optical fiber to activate a downhole tool. FIG. 1 is a schematic of a logging system 5 that can be used downhole. It includes an optical fiber 10 that may be deployed in a conduit 12, with the conduit 12 removably insertable in a wellbore 14 by way of a reel 16 loaded and transported in a truck 18. The optical fiber 10 is connected to a surface opto-electronic unit 20 (with an optical transmitter) that transmits light into the optical fiber 10 and that also receives and analyzes light and reflections therefrom. The logging system 5 includes at least one logging tool 15 and can also include at least one downhole power source 16, which can be a chemical battery, an optical to electrical power convertor, or a hydraulic turbine to electrical power convertor. Subcomponents 17 of the logging tool 15 may be powered by the downhole power source 16 and may be connected to the conduit 12.

In FIG. 1, a packer 150 and perforating gun 152 are also connected to conduit 12 and may be actuated via optical signals transmitted through the optical fiber 10. The packer 150 may actuate to grip and seal against the wellbore walls, or thereafter, to ungrip and unseal from the wellbore walls. Also, perforating gun 152 may actuate to shoot the shaped charges 155 and create perforations 154 in the wellbore. Each of the perforating gun 152 and packer 150 comprises a downhole tool 2. Other downhole tools 2 (not shown) may also be connected to the conduit 12 and activated with an optical signal, including flow control valves, such as sleeve valves and ball valves, samplers, sensors, pumps, screens (such as to expand), chemical cutters, plugs, detonators, or nipples.

The system illustrated in FIG. 1 is one way in which the present invention may be implemented in a wellbore. Instead of being part of an intervention or logging system 5 as shown in FIG. 1, the present invention may also be implemented on a permanent completion 60, such as the one shown in FIG. 12. In this embodiment, production tubing 62 may be deployed in wellbore 14. A packer 50 maintains tubing 62 in place in relation to wellbore 14. At least one downhole tool 2 (as described above) is deployed on production tubing 62, below or above the packer 50. Conduit 12 is attached to production tubing 62 typically by way of fasteners (not shown) and typically on the outside of tubing 62. Optical fiber 10 is inserted within the conduit 12 and is in functional connection with the unit 20. Optical fiber 10 is also in functional connection with the tools 2 which are meant to be activated by optical signal 40.

The downhole tools 2 described in the previous paragraphs may be activated by optical signals sent through the optical fiber 10. For instance, the downhole tool 2 may be functionally connected to the optical fiber 10 so that a specific optical signal frequency, signal, wavelength or intensity sent through the optical fiber 10 by the unit 20 activates the downhole tool 2. Or, the downhole tool 2 may be functionally connected to the optical fiber 10 so that the presence of a certain amount of light in the optical fiber 10 activates the downhole tool 2.

Figure 2:
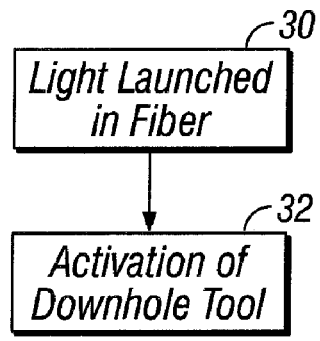
FIG. 2 shows a flow chart of the method used to activate downhole tools.

FIG. 2 shows the general sequence in which light is launched into an optical fiber at 30 resulting in the activation of a downhole tool 2 at 32. In one embodiment and as previously disclosed, an optical signal with a specific characteristic is required to activate the downhole tool 2. In this case, which is beneficial for purposes of safety, the relevant downhole tool 2 is configured so that it receives light from the optical fiber 10, but the downhole tool 2 is only activated if the light received comprises or includes a specific optical signal. The optical signal can have a variety of embodiments.

Figure 3:
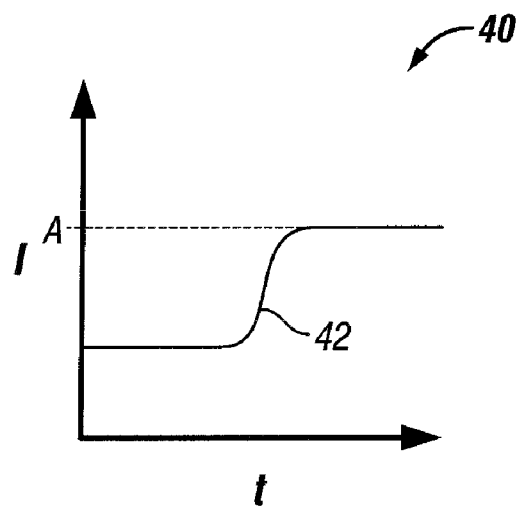
FIGS. 3-7 illustrate different embodiments of the optical signal.
Figure 4:
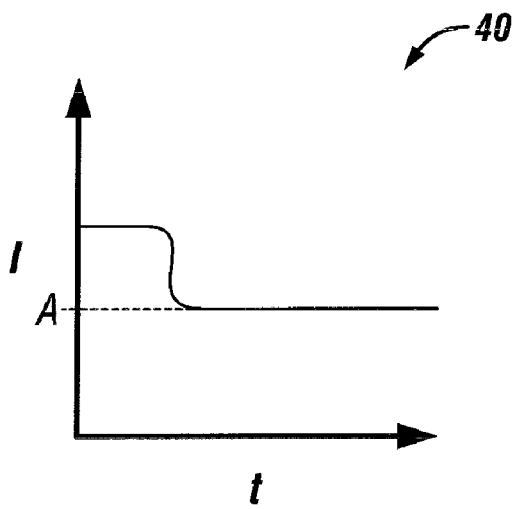

As shown in FIG. 3, optical signal 40 can comprise a certain intensity reached by the light traveling through the optical fiber. For instance, optical signal 40 may comprise a continuous lightwave 42 whose intensity is raised up to a level "A", at which point the relevant downhole tool 2 is activated. FIG. 4 is similar to FIG. 3, except that the optical signal 40 in this case is a continuous lightwave 42 whose intensity is lowered down to a level "A", at which point the relevant downhole tool 2 is activated.

Figure 5:
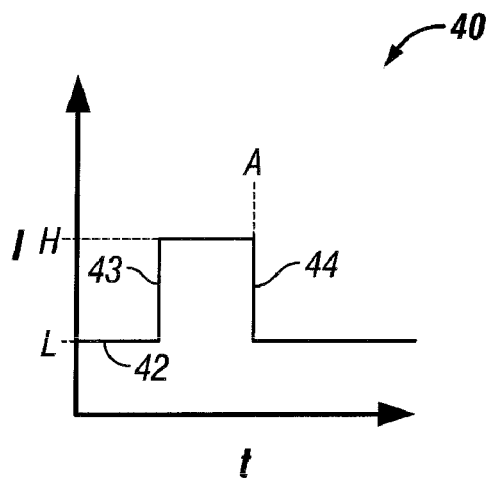
Figure 6:
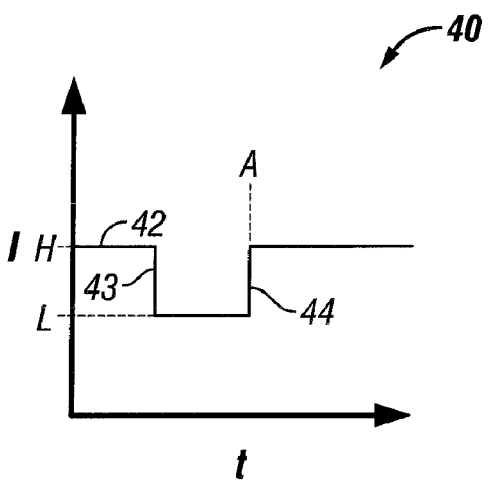

FIGS. 5 and 6 are combinations of the optical signals 40 of FIGS. 3 and 4. In FIG. 5, a continuous lightwave 42 begins at an intensity level "L", is then raised at 43 to an intensity level "H", and is subsequently lowered at 44 again to the intensity level "L". Downhole tool 2 is not activated until the continuous lightwave 42 is lowered again to the intensity level "L" after step 44. In FIG. 6, a continuous lightwave 42 begins at an intensity level "H", is then lowered at 43 to an intensity level "L", and is subsequently raised again at 44 to the intensity level "H". Downhole tool 2 is not activated until the continuous lightwave 42 is raised again to the intensity level "H" at step 44.

In FIGS. 5 and 6, it is the multiple intensity levels that trigger the activation; therefore, the downhole tool 2 would have components, such as a microprocessor, to monitor such transitions. Moreover, it is understood that a sequence of different intensities, regardless of whether they are as shown in the Figures, may be used as a triggering signal. For instance, in FIG. 5, after reaching level "H", the optical signal 40 may comprise raising the intensity again to a level higher than "H". Alternatively, in FIG. 6, after reaching level "L", the optical signal 40 may comprise lowering the intensity again to a level higher than "L". Such intensities need only be defined or pre-programmed as the specific triggering signal at the downhole tool 2.

Figure 7:
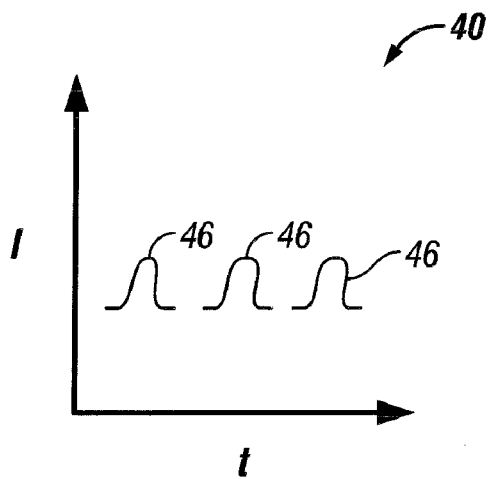

The optical signal 40 of FIG. 7 comprises at least one light pulse 46. The optical signal 40 may also comprise a plurality of light pulses 46. In one embodiment, just the presence of a pulse 46 acts as the optical signal 40. In another embodiment, the presence of a train or a specific number of pulses 46 acts as the optical signal 40. Each pulse 46 may have a specific time duration as well as a specific characteristic (such as intensity and/or wavelength), such that only a pulse that lasts a specified amount of time and/or includes light of a specific intensity or wavelength is considered a valid, triggering pulse 46.

In other embodiments, the presence of a signal (as previously disclosed) having a specific characteristic acts as the optical signal 40. The specific characteristic can comprise a specific frequency, wavelength, pulse code, or intensity. Specific wavelengths, for instance, may be keyed on by the use of at least one filter on the optical fiber 10. Alternatively, a specific intensity may be focused on by including a material on the fiber 10 that ignites or deteriorates when exposed to such particular intensity.

Also, in other embodiments, the optical signal 40 may comprise a combination of at least two of the previously disclosed signals.

Figure 8:
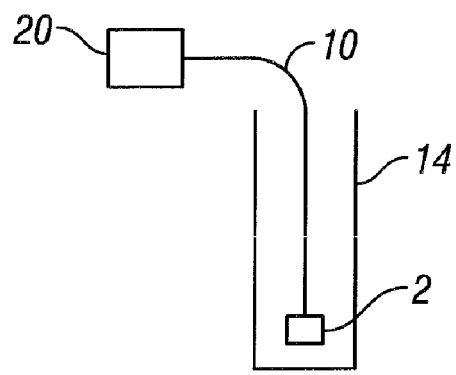
FIG. 8 illustrates another embodiment of the activation system and methods.

To enable the transmission of such optical signals 40, the unit 20 (as seen in FIG. 8) includes an optical transmitter which transmits the optical signal 40 through optical fiber 10 (which is deployed in wellbore 14). Depending on the type of optical signal 40, unit 20 may comprise a laser, such as a semiconductor laser, which is preferred at moderate power levels. However, certain embodiments require high powers for which other types of laser are especially appropriate, such as fibre lasers (e.g. based on Er-doped fibre) which are able to deliver significant intensity levels into an optical fibre. In certain embodiments other sources, such as light emitting diodes may be appropriate.

Figure 9:
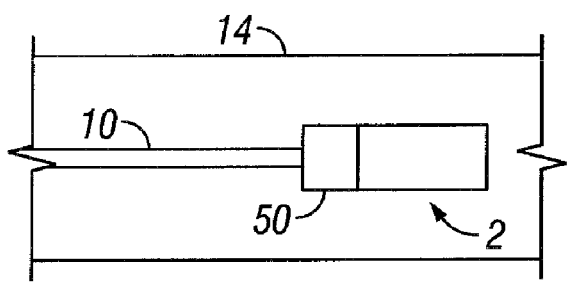
FIG. 9 shows a generic illustration of the receptor of the present invention.

To receive the optical signal 40, the downhole tool 2 includes a receptor 50 which receives the optical signal 40 from optical fiber 10. As shown in FIG. 9, receptor 50 is functionally connected to the optical fiber 10. Receptor 50 receives the optical signal 40, verifies it is the correct triggering signal, and subsequently activates or enables the activation of the downhole tool 2. The verification step may be performed by comparing the signal received to the correct triggering signal or by incorporating components that only function when exposed to the correct triggering signal.

Figure 10:
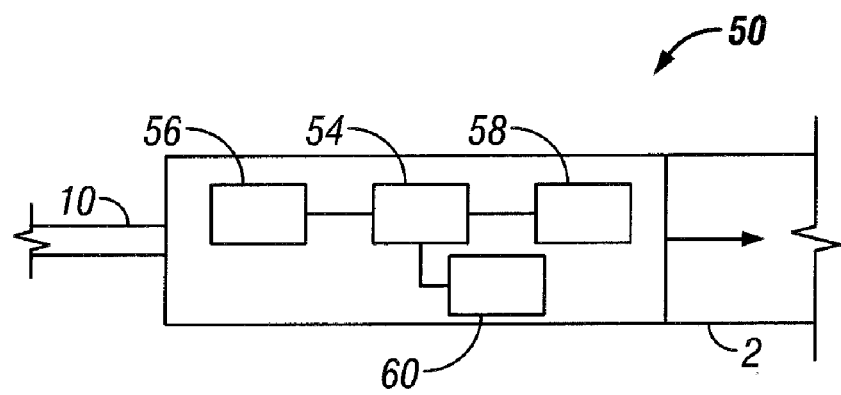
FIGS. 10-11 show different embodiments of the receptor.

In one embodiment as shown in FIG. 10, receptor 50 comprises a microprocessor 54 that processes the optical signal 40, determines whether the optical signal 40 matches a pre-programmed triggering signal, and, if there is a match, the microprocessor 54 activates or enables the activation of the downhole tool 2. Microprocessor 54 may be functionally linked to a storage 56 and a controller 58.

Microprocessor 54 may comprise an optical arrangement that may contain a combination of filters or lenses or other optical devices. It may comprise an analog or digital circuit. It could be a simple transistor or a complex digital microprocessor. Storage 56 may comprise a programmable computer storage unit or an analog or digital circuit. Controller 58 may comprise a mechanical trigger, a hydraulic valve, an explosive detonator, precursor chemical reaction, a thermal sensitive device, an element that bends or contracts or expands under light or light generated heat, an explosive, a pressurized vessel, a vacuum chamber, or a spring.

The pre-programmed triggering signal may be stored in storage 56 to enable microprocessor 54 to access such pre-programmed triggering signal and compare it against the obtained optical signal 40. If a match exists, the microprocessor 54 may activate controller 58 which may actuate downhole tool 2. The microprocessor 54 is, in one embodiment, powered by a downhole battery 60. In other embodiments, microprocessor 54 is powered by the optical fiber 10 or by an independent electrical line (not shown).

Figure 11:
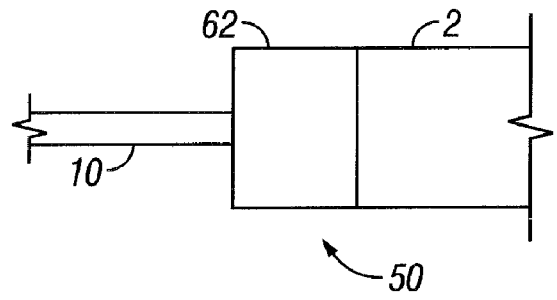

In another embodiment as shown in FIG. 11, receptor 50 comprises an actuator 62 that actuates the downhole tool 2 directly upon reception of the correct optical signal 40, but does not compare the received optical signal 40 to a pre-determined signal (as is the case with the embodiment of FIG. 10). The actuator 62 may, for instance, actuate the downhole tool 2 if the optical signal 40 includes a specific characteristic, as the term was previously described.

In either embodiment of FIG. 10 or FIG. 11, multiple downhole tools 2 may be connected and actuated via the optical fiber 10. In one embodiment, each of the downhole tools 2 is functionally connected to the optical fiber 10. In another embodiment pursuant to FIG. 10, one optical fiber 10 is functionally connected to a microprocessor 54 (and storage 56 and controller 58) which manages the actuation of the multiple downhole tools 2 via the controller 58. The triggering signals for each downhole tool 2 are saved in the storage 56. Microprocessor 54 compares the optical signal 40 obtained from the optical fiber 10 with the stored triggering signals from each of the downhole tools 2. If there is a match, microprocessor 54, through controller 58, activates the relevant downhole tool 2.

In an alternative embodiment, the microprocessor 54 and storage 56 can be replaced with a hard-wired recognition circuit (not shown), which may consist of an electrical circuit designed to pass only a specific characteristic of the optical signal 40 to activate a corresponding tool 2. For instance, the characteristic may be a modulation frequency applied to the optical carrier.

Figure 13:
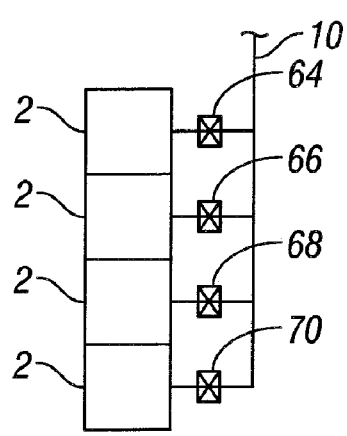
FIGS. 13-14 illustrate different embodiments used to actuate multiple downhole tools.

In another embodiment as shown in FIG. 13, optical filters 64-70 may be used to selectively activate a plurality of downhole tools 2 with a single optical fiber 10. For instance, each optical filter 64-70 may allow a specific wavelength to pass therethrough to the relevant downhole tool 2. The wavelength that passes through the relevant filter can therefore serve as the optical signal 40. As long as each of the filters 64-70 passes a different wavelength, then the downhole tools 2 can be activated selectively.

Figure 14:
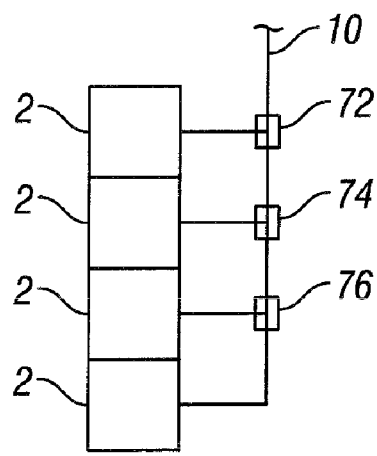

Similarly, in the embodiment shown in FIG. 14, optical couplers 72-76 may be used to selectively activate a plurality of downhole tools 2 with a single optical fiber 10. For instance, each optical coupler 72-76 may be selected so that only a specific wavelength is diverted to a specific downhole tool 2. The embodiment of FIG. 14 is comparatively more efficient than that of FIG. 13 since the optical power intended for a particular tool (of FIG. 14) is passed to the relevant tool with low insertion loss. It may be desirable to insert additional filters in the embodiment of FIG. 14 similar to those filters 64-70 shown in FIG. 13 in order to improve the rejection of the couplers 72-76.

The light being transmitted through the optical fiber 10 may be converted at the downhole tool 2 into electrical energy, chemical energy (including explosive energy), or mechanical energy (including hydraulic energy). Each of these types of energy may then be utilized or harnessed to activate or to result in the activation of the relevant downhole tool 2.

Figure 15:
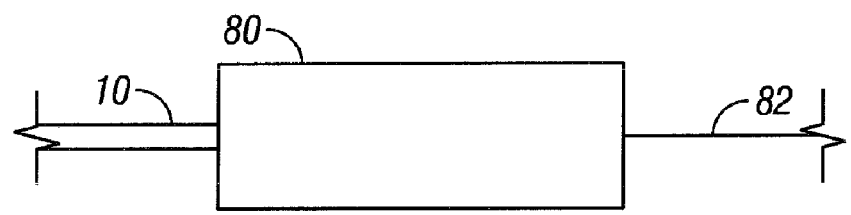
FIG. 15 illustrates an embodiment used to convert optical to electrical power for downhole tools.

Optical energy may be converted to electrical energy by at least one photodiode 80 as shown in FIG. 15. The photodiode 80 generally receives light from the optical fiber 10 and converts it to electrical energy which is then transmitted via line 82 to an initiator circuit (such as the microprocessor 54 of FIG. 10 or its hard-wired equivalent).

Figure 16:
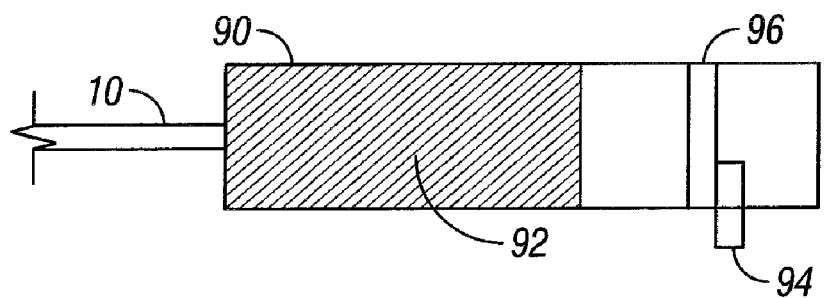
FIG. 16 illustrates an embodiment used to convert optical to chemical power for downhole tools.

Optical energy may be converted to chemical energy by an optically reactive chemical chamber 90 as shown in FIG. 16. Chamber 90 includes an optically reactive substance 92 as well as an environment to enable the reaction of substance 92 when it is subjected to light transmitted through optical fiber 10. Once subjected to light, substance 92 reacts (such as by heating, exploding, or deteriorating) which reaction causes or enables the activation of the relevant downhole tool 2. An explosion within chamber 90 can, for instance, sheer pin 94 enabling piston 96 to move and activate downhole tool 2 (such as the setting of a packer).

Figure 17:
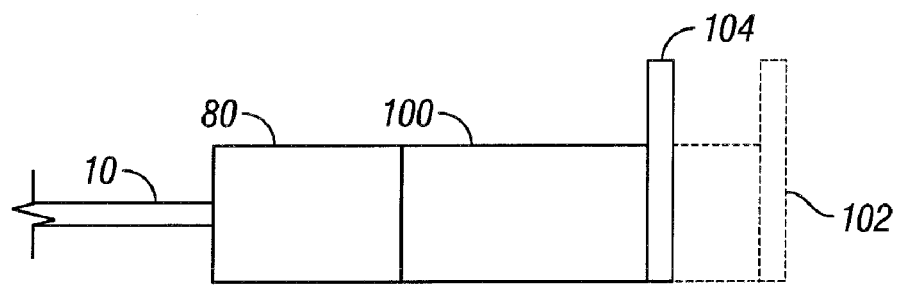
FIG. 17 illustrates an embodiment used to convert optical to mechanical power for downhole tools.

Optical energy may be converted to mechanical energy by a piezoelectric stack 100 as shown in FIG. 17. In this case, the stack 100 may be placed in sequence after the at least one photodiode 80 as described in FIG. 15. Electrical energy converted by the at least one photodiode 80 is transmitted to the stack 100, which stack 100 then expands in size (as shown by dashed lines 102) partaking in mechanical movement. The mechanical movement of the stack 100 causes or enables the activation of the relevant downhole tool 2. For instance, movement of the stack 100 may also cause movement of arm 104, which arm in the unexpanded state maintains a hydraulic circuit (not shown) closed but in the expanded state opens the circuit. The open hydraulic circuit then causes activation of the downhole tool 2.

Figure 18:
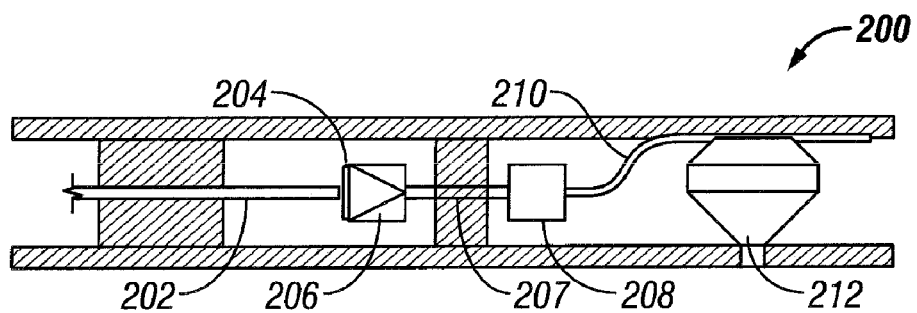
FIGS. 18-19 show different embodiments of a perforating gun assembly activated by light.
Figure 19:
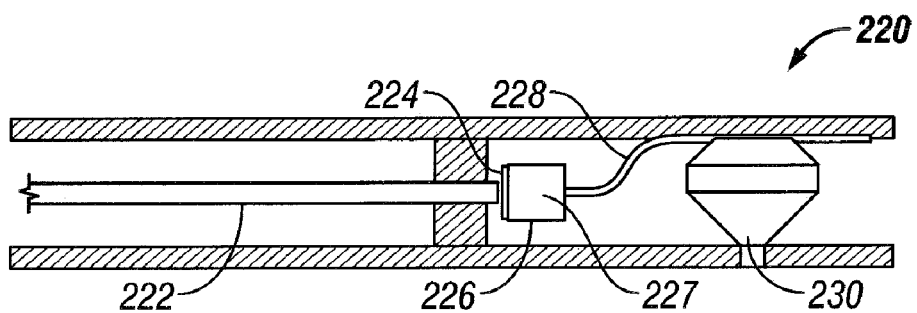

FIGS. 18 and 19 are two examples of downhole tools that may be activated using light as previously described. Although both of the examples are perforating guns, it is understood that other tools may also be activated using similar methods.

FIG. 18 shows a gun assembly 200 including an optical fiber 202, a filter 204, an optical to electrical power converter 206, an electrical connection 207, a firing circuit 208, a prima cord 210, and at least one shaped charge 212. An optical signal 40 is transmitted through optical fiber 202 to the gun assembly 200. Filter 204 can be added at the end of the optical fiber 202 to improve safety by preventing optical radiation of wavelength different from the one provided by the surface unit (such as 20) controller by the operator from reaching the converter 206. Converter 206, which for instance can be a 12 V photovoltaic power converter, receives the optical power and converts it into electrical power. The electric power is then transmitted through electrical connection 207 to the firing circuit 208. The firing circuit 208 then ignites the prima cord 210 which then activates the shaped charges 212, as known in the field.

FIG. 19 shows a gun assembly 220 including an optical fiber 222, a filter 224, a firing device 226, a prima cord 228, and at least one shaped charge 230. An optical signal 40 is transmitted through optical fiber 222 to the gun assembly 220. Filter 224 can be added at the end of the optical fiber 222 to improve safety by preventing optical radiation of wavelength different from the one provided by the surface unit (such as 20) controller by the operator from reaching the firing device 226. Firing device 226 can contain a material 227 that includes a high absorption for the wavelength provided by the light transmission unit controller by the operator. The material 227 is also designed to ignite at a certain optical power level. When exposed to the correct light characteristics transmitted through optical fiber 222, firing device 226 ignites the prima cord 228 which then activates the shaped charges 230, as known in the field.

Figure 20:
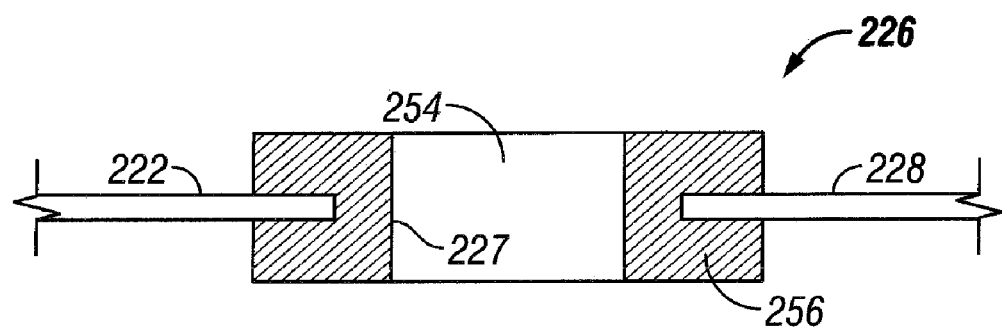
FIGS. 20-21 illustrate different embodiments of the firing device shown in FIG. 19.
Figure 21:
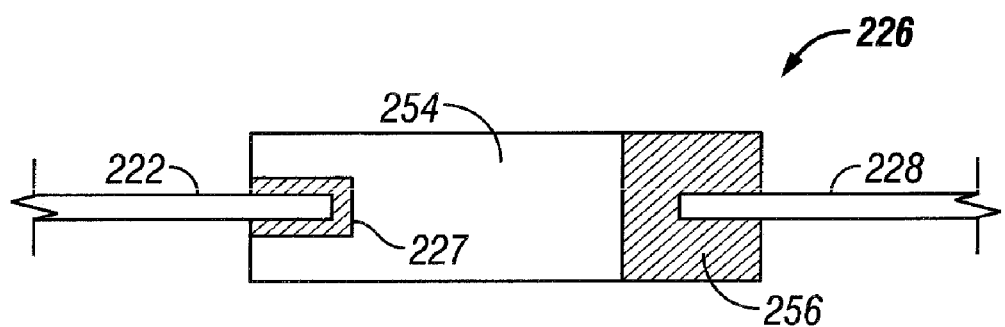

FIG. 20 shows one embodiment of the firing device 226, in which the firing device 226 comprises a chamber 252 having optical fiber 222 as the input end and the prima cord 228 as the output end. Material 227 is located within the chamber 252 so that it surrounds the optical fiber 222. In another embodiment as shown in FIG. 21, material 227 is simply a layer applied to the optical fiber 222 within the chamber 252. An explosive 256 is located within the chamber 252 so that it surrounds prima cord 228. The remainder of the chamber 252 is filled with a substance 254, such as a gas, that is conducive to the ignition of the material 227. Ignition of the material 227 results in ignition of the explosive 256 which in turn ignites the prima cord 228.

Possible compositions of material 227 include particles of silicon, iron oxide, coal, charcoal, phosphorous, gun powder, or starch; alternatively insulating materials such as ceramic wool or thermite may be used. In one embodiment, the material 227 is porous thereby enabling the substance 254 to be in contact with the material 227 at as many places as possible including the area of material 227 that is being heated by the light transmitted through optical fiber 222. Possible compositions for substance 254 include air or oxygen mixed with diethyl ether, ether, carbon disulphide, or n-pentane or hydrogen. In the case where the absorber is combustible (e.g. coal or starch particles) it may be sufficient for the surrounding medium merely to be a source of oxygen.

In another embodiment, not shown, the gun assembly can include the receptor 50 illustrated and described in relation to FIG. 10.

Use of optical signals to actuate perforating guns and other downhole tools increases safety since the optical fiber and signal will be immune to electromagnetic fields. Therefore, the detonation or activation can only occur when the light energy of the right wavelength is transmitted from a specific unit (such as a laser) from the surface. Moreover, in those embodiments in which no battery is used downhole, the method avoids the use of such potentially problematic components. As compared to mechanically activated systems, use of the optical signal to activate perforating guns avoids the use of ball or weight dropping to activate a percussion detonator and the concerns associated therewith.

Figure 22:
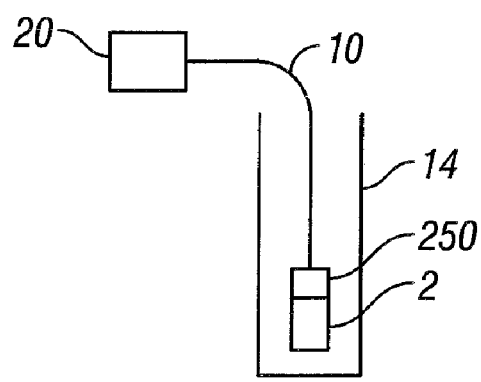
FIG. 22 shows another embodiment of the activation system and methods deployed with a casing collar locator.

It is often times important to know the depth of the downhole tool 2 as the tool 2 is deployed in a wellbore 14. This is to ensure that the tool 2 is activated at the correct depth. For instance, if tool 2 is a perforating gun, then the gun must be activated at the depth of the relevant hydrocarbon formation. Or, if the tool 2 is a packer, then the packer must be activated above or below the relevant formations as required. As shown in FIG. 22, a casing collar locator 250 can be used to determine the depth of a tool 2. In one embodiment, the casing collar locator 250 is electrically powered, by either a downhole battery or an electrical line from surface. In another embodiment, the casing collar locator 250 is a passive optical system which functions by changing the optical signal it reflects back to the unit 20 whenever it passes a casing collar.

Figure 12:
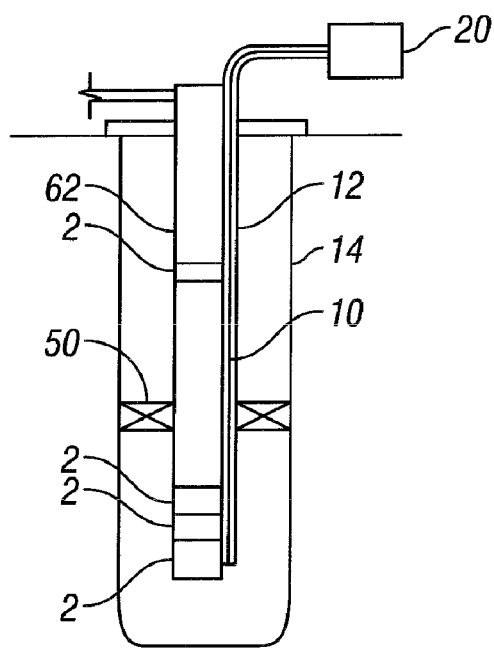
FIG. 12 shows another embodiment of the activation system and methods.

The optical fiber used to transmit light for activation of downhole tool 2 may be implemented in different ways. For instance, it may be housed within a conduit, as shown in FIGS. 1 and 12. It may also be incorporated into a slickline, wherein the slickline supports the weight of the relevant downhole tool 2 and optical fiber. It may also be incorporated into a wireline (or electrical line), wherein the wireline supports the weight of the relevant downhole tool 2 and optical fiber. The optical fiber may also be pumped into a conduit or a coiled tubing unit as described in U.S. Reissue Pat. 37,283.

While the invention has been disclosed with respect to a limited number of embodiments, those skilled in the art, having the benefit of this disclosure, will appreciate numerous modifications and variations therefrom. It is intended that the appended claims cover all such modifications and variations as fall within the true spirit and scope of the invention.

We claim:

1. A system to actuate downhole tools, comprising:
   a downhole tool adapted to be deployed in a wellbore;
   an optical transmitter optically connected to the downhole tool through an optical fiber;
   the optical transmitter adapted to transmit an optical signal through the optical fiber with a predetermined characteristic;
   an optical receptor located downhole to receive the optical signal, the optical receptor having sufficient processing capability to verify the optical signal has the correct predetermined characteristic; and
   wherein upon verification of the correct predetermined characteristic by the optical receptor the downhole tool is activated in response to reception of the optical signal.

2. The system of claim 1, wherein the optical signal comprises a specific number of optical pulses.

3. The system of claim 2, wherein the optical signal comprises at least one pulse with a specific time duration.

4. The system of claim 2, wherein the optical signal comprises at least one pulse of light at a specific intensity, frequency, wavelength, or amount.

5. The system of claim 1, wherein the downhole tool is selected from the group consisting of a packer, a perforating gun, a valve, a sampler, a sensor, a pump, a screen, a chemical cutter, a plug, a detonator, or a nipple.

6. The system of claim 1, wherein a receptor receives the optical signal, verifies the optical signal is a valid triggering signal, and subsequently enables the activation of the downhole tool.

7. The system of claim 6, wherein:
   the receptor comprises a microprocessor, storage, and a controller;
   the valid triggering signal is stored in the storage;
   the microprocessor compares the optical signal to the valid triggering signal; and
   the microprocessor activates the controller when the optical signal matches the stored valid triggering signal.

8. The system of claim 1, wherein a plurality of downhole tools are functionally connected to the optical fiber so that each of the downhole tools may be activated in response to the reception of the optical signal.

9. The system of claim 8, wherein a different optical signal activates different downhole tools.

10. The system of claim 8, further comprising at least one optical filter functionally connected to the optical fiber that allows only light at a specific wavelength to pass therethrough to activate at least one of the plurality of downhole tools.

11. The system of claim 8, further comprising at least one coupler functionally connected to the optical fiber that diverts only light at a specific wavelength towards at least one of the plurality of downhole tools to activate such downhole tool.

12. The system of claim 1, wherein:
   the optical signal is received by at least one photodiode;
   the at least one photodiode converts the optical signal into electrical energy; and
   the electrical energy is transmitted to an initiator circuit to activate the downhole tool.

13. The system of claim 1, wherein:
   the optical signal is transmitted into an optically reactive chemical chamber;
   the chamber contains an optically reactive substance that chemically reacts when subjected to light; and
   the chemical energy is transferred to activate the downhole tool.

14. The system of claim 13, wherein the chamber includes an environment conducive to chemical reaction of the substance to light.

15. The system of claim 13, wherein the reaction is one of heating, exploding, or deteriorating.

16. The system of claim 1, wherein:
   the optical signal is converted into an electrical signal and is then transmitted into a piezoelectric stack that expands when exposed to electrical energy; and the expansion of the stack is used to activate the downhole tool.

17. The system of claim 1, further comprising a casing collar locator used to determine the depth of the downhole tool.

18. A method to actuate downhole tools, comprising:
deploying a downhole tool in a wellbore;
optically connecting the downhole tool to an optical transmitter through an optical fiber;
transmitting an optical signal with a predetermined characteristic from the optical transmitter through the optical fiber;
receiving the optical signal downhole at an optical receptor having sufficient signal processing capability to verify the optical signal has the predetermined characteristic; and
upon verification by the optical receptor, activating the downhole tool in response to reception of the optical signal.

19. The method of claim 18, wherein the transmitting step comprises transmitting an optical signal including a specific number of optical pulses.

20. The method of claim 18, wherein the deploying step comprises deploying the downhole tool as part of a logging system.

21. The method of claim 18, wherein the deploying step comprises deploying the downhole tool as part of a permanent completion.

22. The method of claim 18, wherein the deploying step comprises deploying the downhole tool as part of a coiled tubing system.

23. The method of claim 18, further comprising functionally connecting a plurality of downhole tools to the optical fiber so that each of the downhole tools may be activated in response to the reception of the optical signal.

24. The method of claim 23, further comprising functionally connecting at least one optical filter to the optical fiber, the optical filter allowing only light at a specific wavelength to pass therethrough to activate at least one of the plurality of downhole tools.

25. The method of claim 23, further comprising functionally connecting at least one coupler to the optical fiber, the coupler diverting only light at a specific wavelength towards at least one of the plurality of downhole tools to activate such downhole tool.

26. The method of claim 18, further comprising:
receiving the optical signal at an at least one photodiode, the at least one photodiode converting the optical signal into electrical energy; and
transmitting the electrical energy to an initiator circuit to activate the downhole tool.

27. The method of claim 18, further comprising:
transmitting the optical signal into an optically reactive chemical chamber;
providing an optically reactive substance in the chamber that chemically reacts when subjected to light; and
transferring the chemical energy to activate the downhole tool.

28. The method of claim 18, further comprising:
converting the optical signal into an electrical signal;
transmitting the electrical signal into a piezoelectric stack that expands when exposed to electrical energy; and
utilizing the expansion of the stack to activate the downhole tool.

29. The method of claim 18, further comprising determining the depth of the downhole tool by using a casing collar locator.

\* \* \* \* \*